United States Patent [19]
Dadourian

[11] Patent Number: 5,343,252
[45] Date of Patent: Aug. 30, 1994

[54] METHOD AND APPARATUS FOR COMPOSITING VIDEO IMAGES

[75] Inventor: Arpag Dadourian, Northridge, Calif.

[73] Assignee: Ultimatte Corporation, Chatsworth, Calif.

[21] Appl. No.: 48,750

[22] Filed: Apr. 15, 1993

[51] Int. Cl.$^5$ .............................................. H04N 9/74
[52] U.S. Cl. .................................... 348/586; 348/587; 348/592
[58] Field of Search ................. 358/22, 22 C, 22 CK, 358/183, 28; 348/586, 587, 592, 649, 584; H04N 9/74

[56] References Cited

U.S. PATENT DOCUMENTS 4,580,158  4/1986  Macheboeuf ......................... 358/22
5,032,901  7/1991  Vlahos .................................. 358/22

*Primary Examiner*—James J. Groody
*Assistant Examiner*—Sherrie Hsia
*Attorney, Agent, or Firm*—Blakely, Sokoloff, Taylor & Zafman

[57] ABSTRACT

A method and apparatus to improve the control signal $E_c$ used in a video image compositing system so that the adjustment to achieve an $E_c$ of just zero for green objects and flesh tones, does not simultaneously reduce $E_c$ in grey scale subjects and cause print-through. The invention also reproduces a wide range of blue colors from pale blue to bright blue in the presence of a blue backing without raising a matte density control and without raising noise level. The invention also provides a second control signal, $E_k$, that eliminates backing color spill from blond and brown hair, without affecting bright foreground white tones. The invention also generates a SHADOW CLEAN-UP signal that eliminates foreground shadows, while preserving most of the foreground detail information.

11 Claims, 4 Drawing Sheets

FIG. 1

METHOD AND APPARATUS FOR COMPOSITING VIDEO IMAGES

BACKGROUND OF THE INVENTION

U.S. Pat. Nos. 4,100,569, 4,344,085, 4,589,013 and 4,625,231 describe a unique linear method for compositing a foreground subject disposed between a colored backing and camera, and a background scene, to form a composite image. This method reproduces at full level everything in the foreground scene that is visible to the cameras (except the colored backing), without attenuation and without in any way altering the subject, even when it is a puff of steam, a wisp of hair, or a reflection from a window. It is linear because it also reproduces the background scene behind and through the transparent portion of the foreground scene as a linear function of the luminance and visibility of the colored backing.

The background scene video level is regulated by control signal $E_c$, which is proportional to the luminance and visibility of the backing. The blue backing is removed, not by switching it off, but by subtracting a portion of $E_c$ equal to each of the blue, green, red (B, G, R) components of the backing. Having its video signal reduced to zero leaves the backing ready to accept the background video signal by simple addition. The listed patents explain these functions in full detail.

In this invention, the $E_c$ control signal is improved by removing some of its limitations. These limitations will become apparent in the following description. In its simplest form:

$$E_c = B - max(G,R) \qquad \text{Eq.-1}$$

where "max" designates the larger of green and red.

As the scanning spot leaves the blue backing and begins to enter the subject, the $E_c$ control signal begins to drop and, ideally, should just reach zero as the scanning spot just clears the backing and is fully within the subject. For a sharply focused subject this transition occurs within the width of the scanning spot. For an out-of-focus subject the transition occurs over the width of the semi-transparent blurred edge.

It is essential that $E_c$ go fully to zero when the foreground subject is fully opaque, otherwise the background scene will become visible through the opaque foreground subject. Such print-through is unacceptable in production quality composites.

An $E_c$ that just reaches zero in Equation 1 occurs for grey scale objects because B, G, R are equal to each other.

$E_c$ also just reaches zero for cyan (B=G) and for magenta (B=R).

If a blue subject is examined however, such as blue eyes (typical values for RGB are B=80, G=70, R=60), then $E_c$ in Equation 1 will not reach zero and will cause print-through of the background scene even though the subject is opaque. For this reason Equation 1 is modified to add a constant $K_2$ as follows:

$$E_c = B - K_2 max(G,R) \qquad \text{Eq.-2}$$

By raising $K_2$ from 1.0 to 1.14 (14%), G is increased from 70 to a level of 80, and $E_c$ then becomes zero. However, increasing green (and red) by 14% will cause $E_c$ to reach zero for grey scale objects before the scanning spot clears the backing. Being zero, $E_c$ has shut off the background scene before the scanning spot has fully entered the subject. The lack of background video at the edge of the foreground subject leaves a discernible dark line around the foreground subject.

In Eq.-2, $E_c$ also fails to reach zero when a black glossy subject causes a low-level reflection of the blue backing. Since there is little green or red in the blue backing, $K_2$ is not effective for reducing $E_c$ to zero for black glossy objects reflecting the backing. $K_1$ is therefore added for this purpose. The $E_c$ equation now reads:

$$E_c = [(B - K_1) - K_2 max(G,R)]^+ \qquad \text{Eq.-3}$$

(The meaning of the superscript "+" is described below.) This equation may be rewritten as:

$$K\,E_c = [K_1 B - K_2 max(G,R) - K_3]^+ \qquad \text{Eq.-4}$$

which achieves exactly the same result as equation 3.

An alternate method for reducing $E_c$ to zero is as follows:

$$K\,E_c - K_1 = [B - K_2 max(G,R)]^+ \qquad \text{Eq.-5}$$

Equations 3, 4 and 5 are simply variations of the same equation and produce the same result.

In some scenes, particularly close-ups, a person will be the subject of primary interest, and it is important to eliminate the dark line around flesh tones. This was done in the referenced patents by adding the terms $K_3$ and $K_4$ to produce the following equation:

$$E_c = [(B - K_1) - K_2 max(K_3 G, K_4 R)]^+ \qquad \text{Eq.-6}$$

Since the red constant of flesh tones is at least twice as great as the blue or green content, $E_c$ goes to zero much too soon thus leaving a dark edge. This problem was solved in the referenced patents by reducing $K_4 R$ in Eq.-6 to approximate the level of blue in flesh tones thus resulting in $E_c$ reaching zero just as the scanning spot fully clears the blue backing.

$K_3$ permits the reduction of $K_3 G$ when a green subject is the center of interest.

There are times, although rare, when the blue backing is actually cyanish rather than blue. In this event, the $E_c$ equations above simply cannot develop a full level $E_c$ in the backing area. This was corrected in the later referenced patents by adding an additional term $K_5$ as follows:

$$E_c = \{(B - K_1) - K_2[K_5 max(K_3 G, K_4 R) + (1 - K_5) min(K_3 G, K_4 R)]\}^+ \qquad \text{Eq.-7}$$

where "min designates "the lessor" of the terms.

In the case of the cyanish backing, $K_5$ would be set to zero thus reducing equation 7 to:

$$E_c = [(B - K_1) - K_2 min(K_3 G, K_4 R)]^+ \qquad \text{Eq.-7.1}$$

Normally, and assuming a good blue backing, the $E_c$ control signal sets $K_5$ (in Eq. 7) to 1.0, producing equation 6.

It should be noted that setting "K" values to 1.0, zero or some other value, does not create a new equation.

In the equations above,
$K_1$ = Black gloss control
$K_2$ = Matte density control
$K_3$ = Green matte density control
$K_4$ = Red matte density control
$K_5$ = Backing purity control All of the preceding explanations and equations are found in the referenced patents. Table 1 lists typical B, G, R video levels for several colors including pale blue (eyes) and a bright blue. $E_c$ values were calculated using equation 1. $E_c$ must be 100 for full turn-on of the background (BG) scene, and zero (or below) for full shut-off of the background scene when occluded by opaque subjects.

In the referenced patents, $E_c$ is prevented from going negative by the use of a zero clip. The zero clip is designated in the equations by the plus (+) symbol placed as a superscript on the terms generating $E_c$ such as: $E_c = [---]^+$. The zero clip is achieved using an "OR" gate with one of its inputs set to zero.

There are other ways of generating a zero clip that are not described in the referenced patents. For example, in the equation:

$$E_c = max(B,G) - max(G,R) \qquad \text{Eq.-8}$$

the term $max(B,G)$ effectively introduces a zero clip for certain colors.

A zero clip for all colors is achieved by the following equation:

$$E_c = K_1[max(K_bB, K_gG, K_rR) - K_2 max(K_gG, K_rR)] \qquad \text{Eq.-9}$$

While equation 9 appears to be different than equation 6, it produces exactly the same result. Table 1 lists the values of $E_c$ without the zero clip so as to show the negative $E_c$ before being clipped. The size of the negative number is also an indication of the point in the transition from backing to subject when $E_c$=zero. If $E_c$ is 100 for the blue backing and $-100$ for a reddish subject, then $E_c$ becomes zero when the scanning spot is half way through the transition. Equation 9, when reset to calculate $E_c$ in Table 1, will show an $E_c$ of zero for all colors except the blue colors. However, each of its two terms include the expression "MAX", which is an "OR" gate and therefore a zero clip. In the transition from backing to subject, $E_c$ reaches zero for a given color at exactly the same point in the transition for equations 1, 2, 3, 4, 5, 6, 7, 8, and 9. These equations are all variations of the same basic equation best expressed as equation 7, and all produce the same zero crossing for the colors in Table 1.

While equations 4, 5, 8 and 9 are not specifically shown in the referenced patents, they perform the same function and get the same result. Therefore, they are not considered to be new or different or more useful.

TABLE 1

| COLOR | B | G | R | $E_c$ | $E_c \times 1.67$ |
|---|---|---|---|---|---|
| Blue backing | 80 | 20 | 20 | 60 | 100 |
| Blue eyes | 80 | 70 | 60 | 10 | 17 |
| Vibrant blue | 80 | 50 | 20 | 30 | 50 |
| White | 80 | 80 | 80 | 0 | 0 |
| Grey | 20 | 20 | 20 | 0 | 0 |
| Black | 5 | 5 | 5 | 0 | 0 |
| Cyan | 80 | 80 | 20 | 0 | 0 |
| Magenta | 80 | 20 | 80 | 0 | −100 |
| Green | 20 | 80 | 80 | −60 | −117 |
| Yellow | 10 | 80 | 80 | −70 | −117 |
| Red | 10 | 10 | 80 | −70 | −117 |
| Flesh | 20 | 25 | 70 | −50 | −63 |

In the last column of Table 1, $E_c$ is raised by a factor of 1.67 so as to provide 100% turn-on of the background scene in the blue backing area. Note that for blue eyes and vibrant blue, $E_c$ is above zero. The background scene will show through blue eyes as though they were 17% transparent. It will also show through the vibrant blue as though it was 50% transparent. $E_c$ for green, yellow, red and flesh tones (with Caucasian makeup) is negative. This means that the background scene is shut off (zero $E_c$) when the scanning spot is about half way onto a green subject and less than half way onto a red or yellow subject. Shutting off the background scene before the scanning spot is fully onto the subject leaves a gap of reduced video (i.e., a dark line). When flesh tones are dominant, dropping $K_4$ to reduce red to the level of green in Equation 6 eliminates the dark line around red and flesh tones. When green is predominant, $K_3$ is used to drop green to the level of red to eliminate the dark line around a brilliant green.

Nothing in the $E_c$ equations listed in the referenced patents permits the use of blue-subject colors except by increasing $K_2$ in Equation 6. In doing so, all grey scale subjects as well as cyan and magenta will exhibit a negative $E_c$, as shown in Table 2 below, as well as increased noise level.

Table 2 shows $E_c$ when $K_2$ is raised to 1.14 in Equation 6. $E_c$ is multiplied by 1.75 to bring it up to 100 for full turn-on of the background scene.

$E_c$ for blue eyes is now zero, which is what is needed. However, $E_c$ is 40 for the vibrant blue which means it will print-through. Other colors are acceptable depending upon adjustments to $K_3$ or $K_4$, except for yellow.

Equation 6 is able to reproduce pale shades of blue against a blue backing by increasing $K_2$. A limit as to how blue a subject can be is soon reached by increased noise and visible dark edges to other colors. Raising $K_2$ pushes $E_c$ below zero for all grey scale subjects, as well as cyan and magenta, which is undesirable.

TABLE 2

| COLOR | B | 1.14G | 1.14R | $E_c$ Eq. 4 | $E_c \times 1.75$ |
|---|---|---|---|---|---|
| Blue backing | 80 | 23 | 23 | 57 | 100 |
| Blue eyes | 80 | 80 | 68 | 0 | 0 |
| Vibrant blue | 80 | 57 | 23 | 23 | 40 |
| White | 80 | 91 | 91 | −11 | −19 |
| Grey | 20 | 23 | 23 | −3 | −5 |
| Black | 5 | 6 | 6 | −1 | −2 |
| Cyan | 80 | 91 | 23 | −11 | −19 |
| Magenta | 80 | 23 | 91 | −11 | −19 |
| Green | 20 | 91 | 91 | −81 | −142 |
| Yellow | 10 | 14 | 91 | −81 | −142 |
| Red | 10 | 14 | 91 | −81 | −142 |
| Flesh | 20 | 25 | 70 | −50 | −88 |

The above referenced patents also describe techniques for eliminating secondary illumination from the backing and lens flare from the foreground (FG) object. In case of a blue backing, an object placed in close proximity to the backing receives secondary blue illumination from the backing, which gives the object a pronounced blue tint. The field of the camera lens filled with blue light will cast a blue veil over the foreground object due to multiple internal reflections within the lens.

The method described in the above patents subjects the blue channel to a dynamic clamp, after which all evidence of blue backing is eliminated from the foreground object. The blue clamp equation is:

$$B \leq K_{20}G + K_{22}(G-R)^+ + K_{23}(R-G)^+ + (1-K_{22})min(G,R)$$

This blue clamp equation, also known as Flare Suppression equation $E_k$, can be written as follows:

$$E_k = \{K_{20}B - [K_{22}G + max[K_{22}(G-R), K_{23}(R-G)] + (1-K_{22})min(G,R)]\}^+$$

Where:
- $K_{20}$ = White Balance
- $K_{22}$ = Gate 1 / 3 [gate 1 or gate 3]
- $K_{23}$ = Gate 2 and the following procedures apply:

1. $K_{20}$ is nominally 1.0 for a white balance on white foreground objects.
2. $K_{22}$ is normally 1.0 for most scenes, so that blue foreground objects preserve their color. In situations where the foreground object is green, blue flare will cause the color to turn cyan. Setting $K_{22}$ to 0.0 will restore the green color to the foreground object.
3. $K_{23}$ is normally set to 0.0, which prevents foreground flesh colors from taking on a magenta tint from the blue spill light. If it is essential to reproduce pink or magenta colors, then $K_{23}$ is set to a value between 0.0 and 1.0. It is important to set $K_{23}$ to a value just sufficient to produce a subjectively satisfying pink or magenta, thereby minimizing the degree to which flesh tones take on a magenta tint.

When dealing with blond or brown hair in front of a blue screen, $K_{20}$ [white balance] is adjusted to suppress blue flare. In doing so, white foreground objects take on a warmer hue. In this invention, a new control is added to the $E_k$ equation, to deal with the problem described above. This new control, BLACK BALANCE, acts as a "negative gain" on the blue channel in the $E_k$ equation, as opposed to a "positive gain" of the WHITE BALANCE control.

In many blue screen productions, it is necessary to electronically eliminate screen markings, imperfections, suspension wires, unwanted shadows and other undesired screen elements from the final composite. The above mentioned patents describe means of eliminating all these undesired screen elements with the use of CLEAN-UP and CLEAN-UP BALANCE controls. Unfortunately, the use of these controls has an undesired penalty: loss of fine detail from the foreground object. Later patents by the inventor of the above mentioned patents, dealing with screen correction, describe alternate techniques for handing variations in screen brightness and color uniformity, without any loss of detail from the foreground object. Screen correction processing eliminates all screen imperfections that are common in the foreground frame and the reference frame, while preserving all detail and shadow information of the foreground object. There are instances however, where it is desirable to preserve foreground object detail, with simultaneous elimination of foreground shadow. Neither clean-up in its existing form, nor screen correction will yield a satisfactory result, as elimination of foreground shadows will result in loss of foreground detail. This invention is directed to a method and apparatus for achieving the desired result.

BRIEF SUMMARY OF THE INVENTION

It is the purpose of this invention to improve the $E_c$ equation so that the adjustment of $K_3$ and $K_4$ to achieve an $E_c$ of just zero for green objects and flesh tones, does not simultaneously reduce $E_c$ in grey scale subjects and cause print-through. Also, it is the purpose of this invention to reproduce a wide range of blue colors from pale blue to bright blue in the presence of a blue backing without raising the $K_2$ matte density control and without raising noise level.

A third objective is to show alternate $E_c$ equations for producing these results.

A fourth objective of this invention is to show alternate $E_k$ equation that eliminates backing color spill from blond and brown hair, without affecting bright foreground white tones.

A fifth objective of this invention is to generate a SHADOW CLEAN-UP equation that eliminates foreground shadows, while preserving most of foreground detail information.

DETAILED DESCRIPTION OF THE INVENTION

Figure 1:
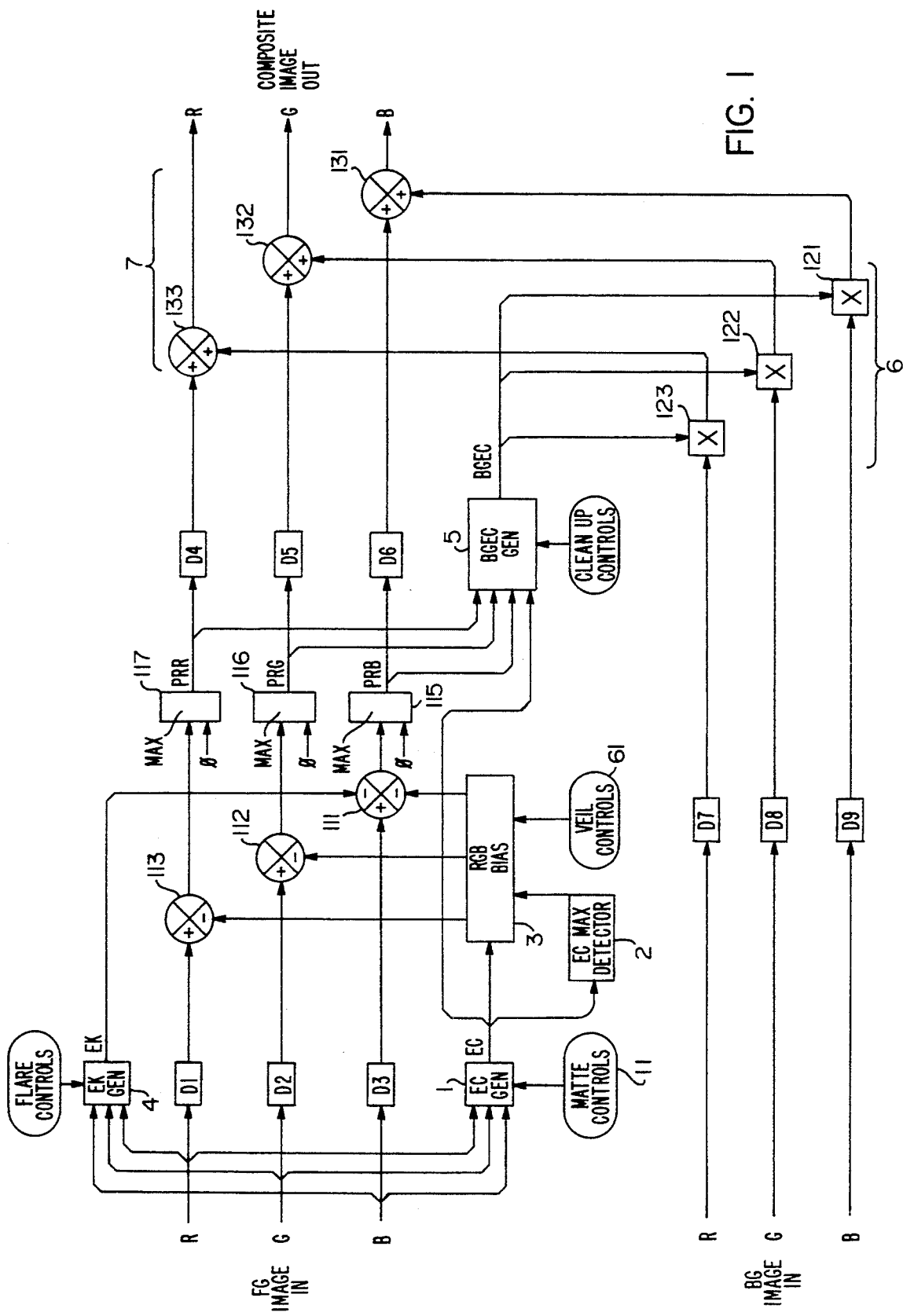
FIG. 1 is a block diagram of an image compositing system.

Flesh tones, as noted in Table 1, may have video levels such as 20 blue, 25 green, and 70 red. In order to obtain an $E_c$ of zero just as the scanning spot completes its transition, both green and red must be reduced to 20. In doing so, the $E_c$ which was already zero for grey scale, cyan and magenta subjects, will now become positive, causing print-through (i.e., background scene not shutting off). This problem is corrected by the new $E_c$ equation:

$$E_C = \{(B-K_1) - K_2 max(G,R) + [max(K_3G, K_4R) - min(G,R)]\}^+ \quad \text{Eq.-10}$$

In the above equation, with $K_1$ set to zero the term $E_c = B - K_2 max(G,R)$ will cause $E_c$ to be zero for all grey scale subjects as well as cyan and magenta, but negative for flesh tones. The next term, $max(K_3G, K_4R) - min(G,R)$, will be positive thus bringing $E_c$ just to zero for flesh tones with the $K_3$-$K_4$ adjustment. Grey scale subjects will not be affected and $E_c$ remains just at zero. Cyan and magenta, if present, will show a positive $E_c$.

A simple method that yields the same results as Eq.-10 is achieved by equation 11:

$$E_c = (B-K_1) - K_2 max[min(G,R), K_3G, K_4R]^+ \quad \text{Eq.-11}$$

In this equation, $K_3$ and $K_4$ may be adjusted to obtain an exact zero for flesh tones and grey scale subjects simultaneously.

An alternate equation 11 is:

$$E_c = (B-K_1) - max[K_2 min(G,R), K_3G, K_4R]^+ \quad \text{Eq.-11a}$$

It has always been assumed by experts involved in image compositing that because the backing color was blue, one must avoid any significant blue as a foreground subject color due to the dark line problem and noise.

An improved $E_c$ to be described permits the inclusion of a wider range if blue foreground colors without an increase in $K_2$ and without a significant dark line penalty.

The blue color selected for the backing contains very little green or red component in order to maximize $E_c$ for reduced noise, and to reduce cross-talk on color film. $E_c$ is maximized by making blue high, with green and red equally low. A video of 80 blue, 20 green and 20 red represents such a backing.

Many bright blue colors have a descending level of video from blue to green to red as may be noted on Table 3. This almost linear descending order is utilized in this invention.

What is needed is a way to achieve an $E_c$ of zero for blue eyes and blue wardrobe without raising $K_2$ in Equation 6, or in the improved Equation 10, Equation 11, and Equation 11a, which is an objective of this invention. To the above-mentioned equations, a new term, $max [K_5(G-R), K_5(R-G)]$, is added to produce a series of improved equations 12-14a. This added term allows for a wider range of blue foreground objects, with descending B, G, R or B, R, G levels to be used in front of a blue screen, with minimal penalties. The new set of equations are:

$$E_c = \{(B-K_1) - K_2 max(K_3 G, K_4 R) - max[K_5(G-R), K_6(R-G)]\}^+ \quad \text{Eq.-12}$$

$$E_c = \{(B-K_1) - K_2 max(G,R) + [max(K_3 G, K_4 R) - min(G,R) - max[K_5(G-R), K_6(R-G)]]\}^+ \quad \text{Eq.-13}$$

$$E_c = \{(B-K_1) - K_2 max[min(G,R), K_3 G, K_4 R] - max[K_5(G-R), K_6(R-G)]\}^+ \quad \text{Eq.-14}$$

$$E_c = \{(B-K_1) - max[K_2 min(G,R), K_3 G, K_4 R] - max[K_5(G-R), K_6(R-G)]\}^+ \quad \text{Eq.-14a}$$

It may be noted that Equation 12 is equation 6 with a third term added and controlled by $K_5$ and $K_6$.

The same colors and video levels used for Tables 1 and 2 are used in Equation 12 and Table 3 as follows: $K_5$ and $K_6 = 0$, and $K_2 K_3 K_4 K_5 = 1.0$ then $E_c = (B - [max (G,R) + K_5 (G-R)])^+$.

As can be seen from examining the last three columns of Table 3 showing $E_c$ from Tables 1, 2 and 3, that $E_c$ from Table 3 (Equation 12) provides an exact zero for $E_c$ for blue eyes, vibrant blue and all grey scale subjects. The dark line problem is somewhat increased for cyan, magenta, green and flesh tones unless corrected by $K_3$ or $K_4$. Equation 13, Equation 14, and Equation 14a allow the correction of both $K_3$ and $K_4$ at the same time.

tions are generated based on the ratio of the backing color values. These equations are:

$$GE_c 1 = G - K_7 B$$

$$RE_c 1 = R - K_8 B$$

Where:
$K_7 = GMAX/BMAX$, $K_7 > 0$
$K_8 = RMAX/BMAX$, $K_8 > 0$
RMAX, GMAX, BMAX are the R, G, B values at a reference backing area selected (manually or automatically) at the position in the backing area with the purest blue of the backing when done automatically or an area having fine foreground detail, such as hair, when done manually.

The ratio equations represent the amount of foreground object color deviation from the backing color, based on G/B and R/B values. These equations can have both positive and negative values for foreground objects, and zero for the backing area for all brightness values.

Select the negative parts of $GE_c 1$ and $RE_c 1$ as follows:
GCOR1 = MIN $[GE_c 1, 0]$
RCOR1 = MIN $[RE_c 1, 0]$ Generate two new equations from GEC1 and GCOR1 as follows:

$$GE_c 2 = [1/(1-K_7)] [G - GCOR1 - K_7 B]$$

$$GE_c 3 = [1/(1-K_7)] [G - (GCOR1/K_7) - K_7 B]$$

Generate two new equations from $RE_c 1$ and RCOR1 as follows:

$$RE_c 2 = [1/(1-K_8)] [R - RCOR1 - K_8 B]$$

$$RE_c 3 = [1/(1-K_8)] [R - (RCOR1/K_8) - K_8 B]$$

Where $GE_c 2$, $GE_c 3$, $RE_c 2$, and $RE_c 3$ have positive values for foreground objects, and zero for backing area.

From $GE_c 2$, $GE_c 3$, $RE_c 2$, $RE_c 3$ generate two equations as follows:

$$E_c T2 = MAX[K_3 GE_c 2, K_4 RE_c 2]$$

$$E_c T3 = MIN[GE_c 3, RE_c 3]$$

To the $E_c$ equation 3, add the above two terms to generate a new $E_c$ equation as follows:

TABLE 3

| | 1 | 2 | 3 | 4 | 5 | 6 | 7 | 8 = $E_c$ | | |
|---|---|---|---|---|---|---|---|---|---|---|
| Color | B | G | R | G OR R | Max (G-R), (R-G) | 4 + 5 | 1 − 6 | Ec Table 3 | Ec Table 2 | Ec Table 1 |
| Blue backing | 80 | 20 | 20 | 20 | 0 | 20 | 60 | 100 | 100 | 100 |
| Blue eyes | 80 | 70 | 60 | 70 | 10 | 80 | 0 | 0 | 0 | 17 |
| Vibrant blue | 80 | 50 | 20 | 50 | 30 | 80 | 0 | 0 | 40 | 50 |
| White | 80 | 80 | 80 | 80 | 0 | 80 | 0 | 0 | −19 | 0 |
| Grey | 20 | 20 | 20 | 20 | 0 | 20 | 0 | 0 | −5 | 0 |
| Black | 5 | 5 | 5 | 5 | 0 | 5 | 0 | 0 | −2 | 0 |
| Cyan | 80 | 80 | 20 | 80 | 60 | 140 | 0, −60 | 0, −100* | −19 | 0 |
| Magenta | 80 | 20 | 80 | 80 | 60 | 140 | 0, −60 | 0, −100* | −19 | 0 |
| Green | 20 | 80 | 20 | 80 | 60 | 140 | −120 | −200 | −142 | −100 |
| Yellow | 10 | 80 | 80 | 80 | 0 | 80 | −70 | −117 | −142 | −117 |
| Red | 10 | 10 | 80 | 80 | 70 | 150 | −60, −149 | −234 | −142 | −117 |
| Flesh Tones | 20 | 25 | 70 | 70 | 45 | 115 | −50, −95 | −159 | −105 | −83 |

*The $E_c$ for either cyan or magenta may be reduced to zero.

A fourth technique for obtaining an improved $E_c$ equation is the use of ratios. In this technique, two equations generate a new $E_c$ equation as follows:

$$E_c = \{[B-K_1] - K_2 MAX[G,R] + MAX[E_cT2 - E_cT3]\}^+ \quad \text{Eq.-15}$$

To the above equation add the term: [max $K_5 (G-R), K_6 (R-G)$]

The complete $E_c$ equation is:

$$E_c = \{[B-K_1] - K_2 MAX[G,R] + MAX[E_cT2 - E_cT3] - [max\ K_5(G-R), K_6(R-G)]\}^+ \quad \text{Eq.-16}$$

Equations 15 and 16 are similar to Equations 10 and 13, except that ratio terms are used in Equations 15 and 16.

When warm tones are included such as red, tan, brown, flesh tones, etc., $E_c$ is brought just to zero by reducing $K_4$ in Equation 12. If the subject includes a high-saturation green color, $E_c$ can be made to reach zero at the edge of the subject by decreasing $K_3$. These two options are taught in the previously discussed patents, however, when the subject wardrobe is blue, these prior systems suffered from noise due to the need to raise $E_c$ gain following an increase in $K_2$.

This invention, which is directed to implementations of Equations 10, 11, 11a, 13, 14, 14a, 15, and 16, provides an alternate means of generating the $E_c$ equation, where both $K_3$ and $K_4$ can be adjusted simultaneously, without affecting neutral color objects. This invention also adds the term: $+K_5 (G-R)$ OR $K_6 (R-G)$ to the $E_c$ equations, which permits the use of rather bright and vivid blue colored wardrobe in the foreground scene, without increasing $K_2$ and without raising $E_c$ gain.

A penalty may exist when using blue subjects and a blue backing if the foreground scene also includes both a bright green and a cyan color composited against white. This combination prevents the use of $K_3$ to reduce the dark line problem and, if present, the dark line is made visible when the background scene is white or very light. Because this particular mix of conditions is quite rare, the freedom to use the wardrobe and blue eyes, without degrading the image, is a significant improvement in image compositing.

As mentioned earlier, when dealing with blond or brown hair in front of a blue screen, $K_{20}$[white balance] needs to be adjusted to suppress blue flare. In doing so, white foreground objects take on a warmer hue.

In this invention, a new control is added to the $E_k$ equation, to deal with the problem described above. This new control, BLACK BALANCE, acts as a "negative gain" on the blue channel in the $E_k$ equation, as opposed to a "positive gain" of the WHITE BALANCE control.

The modified $E_k$ equation is:

$$E_k = \{[K_{20}B + [K_{21}((MAXPIX - B)/MAXPIX)]] - [K_{22}G + max[K_{22}(G-R), K_{23}(R-G)] + (1 - K_{22})min(G,R)]\}^+ \quad \text{Eq.-17}$$

Where:
$K_{20}$ = White Balance
$K_{21}$ = Black Balance
$K_{22}$ = Gate 1 / 3 (gate 1 or gate 3)
$K_{23}$ = Gate 2
MAXPIX = Maximum pixel value [maximum allowed foreground value]

Using BLACK BALANCE rather then WHITE BALANCE to solve the problem mentioned above will restore proper hair color, without changing the hue of bright whites. Equation 17 describes a technique having a significant improvement in the flare suppression portion of an image compositing system.

As described earlier, there are blue screen production situations, where it is desirable to preserve foreground object detail, while eliminating shadows from the final composite image. An example is puppeteers wearing blue gloves or suits of the same color as the backing, and moving puppets in front of a blue screen. Since these blue gloves and suits have complex forms (arms or body) which are different then the backing, they will reflect light with varying amounts to different directions, no matter how well they are lit. Since these gloves and suits are of the same blue color as the backing but of varying amounts of brightness, a linear matte equation, similar to any one of the $E_c$ equations described above, will interpret these brightness variations as "shadows" on the backing. Consequently, these variations will be transferred to the background image, and show up in the final composite. Screen correction cannot be used, as the blue glove or suit is part of the foreground image and does not exist in the reference frame, and brightness variations can only be corrected if they exist in both foreground and reference frame. The existing CLEAN-UP function will eliminate these brightness variations, but at the same time it will eliminate fine detail of foreground puppets. Thus the puppets will acquire a hard "cut out" look.

With existing CLEAN-UP, processing background $E_c$ by itself to remove shadows results in glowing edges on foreground objects, because by increasing the gain of $E_c$, the background image will exist at a much higher value then it normally would at FG/BG transition edges. This excess background added to processed foreground results in brighter than usual, and hence glowing, edges. To prevent edges from glowing, CLEAN-UP is applied to the foreground image as well, to reduce foreground edge values. This reduction in foreground edge value results in loss of fine detail information.

The new CLEAN-UP method described below eliminates brightness variations or "shadows", with minimum degradation to fine detail information of the foreground object. This invention makes use of the fact that brightness variations of the screen are transferred to the background image when it is processed, since the background is multiplied by $E_c$. The foreground is processed by subtracting the screen to zero using $E_c$, and since $E_c$ includes the same brightness variations as the screen, all these variations are reduced to zero. This process, described in the above mentioned patents, is the basic image compositing process of Ultimatte Corporation, the assignee of the present invention. This invention uses the processed foreground and $E_c$ equations to generate a new $E_c$ equation, which is then used to process the background image.

For a given foreground image, the processed foreground R, G, B equations are:

$$PR\ R = max\{[R - K_{30}E_c], 0\}$$

$$PR\ G = max\{[G - K_{31}E_c], 0\}$$

$$PR\ B = max\{[B - K_{32}E_c], 0\}$$

Where:
$K_{30}$ = RMAX/$E_c$MAX
$K_{31}$ = GMAX/$E_c$MAX
$K_{32}$ = BMAX/$E_c$MAX $E_c$ could be in its simplest form as in Eq.-2, or in any of the more complex forms described in Eq.-3 to Eq.-16.

$E_c$MAX = the value of $E_c$ at a reference point in the foreground image, which is selected manually or automatically, where the selection criteria selects purest blue of the backing when done automatically or an area having fine foreground detail, such as hair, when done manually.

RMAX, GMAX, BMAX = are R, G, B values of the foreground image representing backing color at the $E_c$MAX point.

$$BGE_c = \{min\{K_{33}E_o[MAXPIX - max(K_{34}PR\ R, K_{35}PR\ G, K_{36}PR\ B)]\}\} + \qquad \text{Eq.-18}$$

Where:
$K_{33}$ = SHADOW CLEAN-UP
$K_{34}$ = R CLEAN-UP
$K_{35}$ = G CLEAN-UP
$K_{36}$32 B CLEAN-UP
MAXPIX = maximum foreground pixel value [maximum allowed foreground value]

As noted earlier, processed foreground does not have screen or shadow information. When the 'higher' of the three foreground channels is reversed [inverted and offset], screen areas which were black become white, and foreground colors are reversed respectively. As shown in Eq.-18, $BGE_c$ is the 'lower' of this term and $E_c$. When $K_{33}$ is set to 1, $K_{34}$, $K_{35}$, and $K_{36}$ set to 0, $BGE_c = E_c$. When a large gain is applied to $E_c$ to eliminate shadow information, and $K_{34}$, $K_{35}$, $K_{36}$ are set for proper edge transition [K>0], the density of the matte within the foreground object is held by $E_c$, but during transitions, the reversed foreground term provides the proper level. Thus shadows are eliminated, with minimum or no degradation to fine detail edges. Only very dark or black foreground objects will suffer from a small amount of edge glow or loss of a small amount of fine detail. Since this method will be mostly used in situations similar to the example of brightly colored puppets, the penalty is negligible compared to the significant advantages it provides.

An alternate technique for generating $BGE_c$ is the screen ratio method. In this technique, the screen color ratio is used to reduce the screen area to zero, including shadows. The ratio equations are obtained as follows:

$$GE_c1 = G - K_7B$$

$$RE_c1 = R - K_8B$$

Where:
$K_7$ = GMAX/BMAX, $K_7 > 0$
$K_8$ = RMAX/BMAX, $K_8 > 0$
RMAX, GMAX, BMAX are the R, G, B values at reference backing area selected manually or automatically at a position in the backing with the purest blue of the backing when done automatically or an area having fine foreground detail, such as hair, when done manually.

The ratio equations represent the amount of foreground object color deviation from the backing color, based on G/B and R/B values. These equations can have both positive and negative values for foreground objects, and zero for the backing area for all brightness values.

The negative parts of $GE_c1$ and $RE_c1$ are selected as follows:

GCOR1 = MIN $[GE_c1, 0]$
RCOR1 = MIN $[RE_c1, 0]$

Generate two new equations from GCOR1 and RCOR1 as follows:

$$GE_c2 = [1/(1-K_7)] [G - GCOR1 - K_7B]$$

$$RE_c2 = [1/(1-K_8)] [R - RCOR1 - K_8B]$$

Where $GE_c2$ and $RE_c2$ have positive values for foreground objects, and zero for backing area.

$$BGE_c = \{min\{K_{33}E_o[MAXPIX - max(K_{37}GE_c2, K_{38}RE_c2)]\}\} + \qquad \text{Eq.-19}$$

Where:
$K_{33}$ = SHADOW CLEAN-UP
$K_{37}$ = $GE_c2$ CLEAN-UP
$K_{38}$ = $RE_c2$ CLEAN-UP
MAXPIX = maximum foreground pixel value (maximum allowed foreground value).

The results obtained by Eq.-19 are very similar to those obtained by Eq.-18. $K_{37}$ and $K_{38}$ operate in a similar manner as $K_{34}$, $K_{35}$, and $K_{36}$ of Eq.-18.

A third technique for generating the $BGE_c$ equation is by simply combining Eq.-18 and Eq.-19 to form a new equation as follows:

$$BGE_c = \{min\{K_{33}E_o[MAXPIX - max(K_{34}PR\ R, K_{35}PR\ G, K_{36}PR\ B, K_{37}GE_c2, K_{38}RE_c2)]\}\} + \qquad \text{Eq.-20}$$

Where:
$K_{33}$ = SHADOW CLEAN-UP
$K_{34}$ = R CLEAN-UP
$K_{35}$ = G CLEAN-UP
$K_{36}$ = B CLEAN-UP
$K_{37}$ = $GE_c2$ CLEAN-UP
$K_{38}$ = $RE_c2$ CLEAN-UP
MAXPIX = maximum foreground pixel value [maximum allowed foreground value]

Functionally, Eq.-20 is very similar to Eq.-18 and Eq.-19, with somewhat redundant controls.

All the improvements described herein can be implemented in analog hardware, or digital hardware, or software, or a combination of any or all of the three methods.

Figure 2:
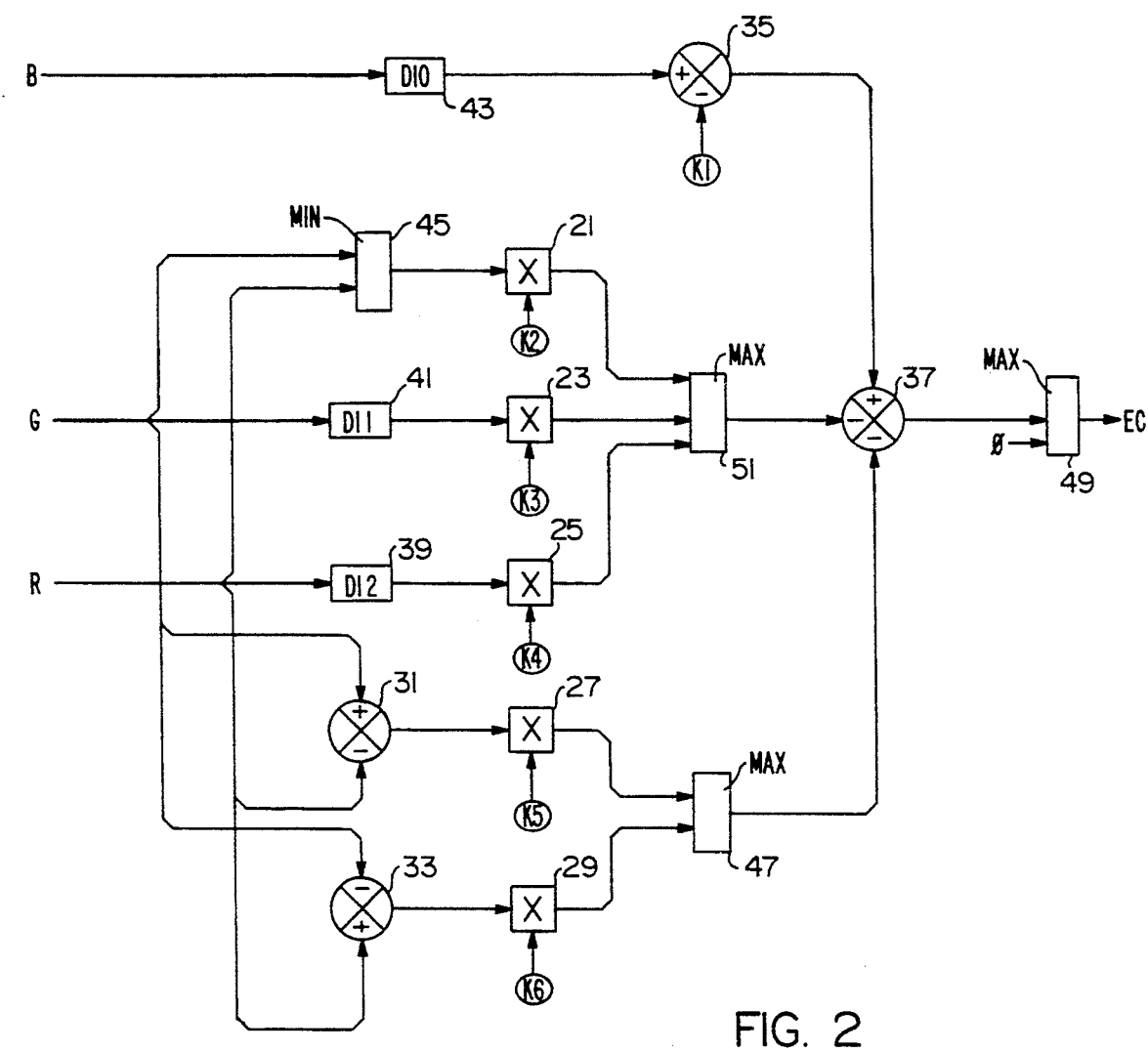
FIG. 2 is a block diagram of the $E_c$ generator block 1 from FIG. 1.
Figure 3:
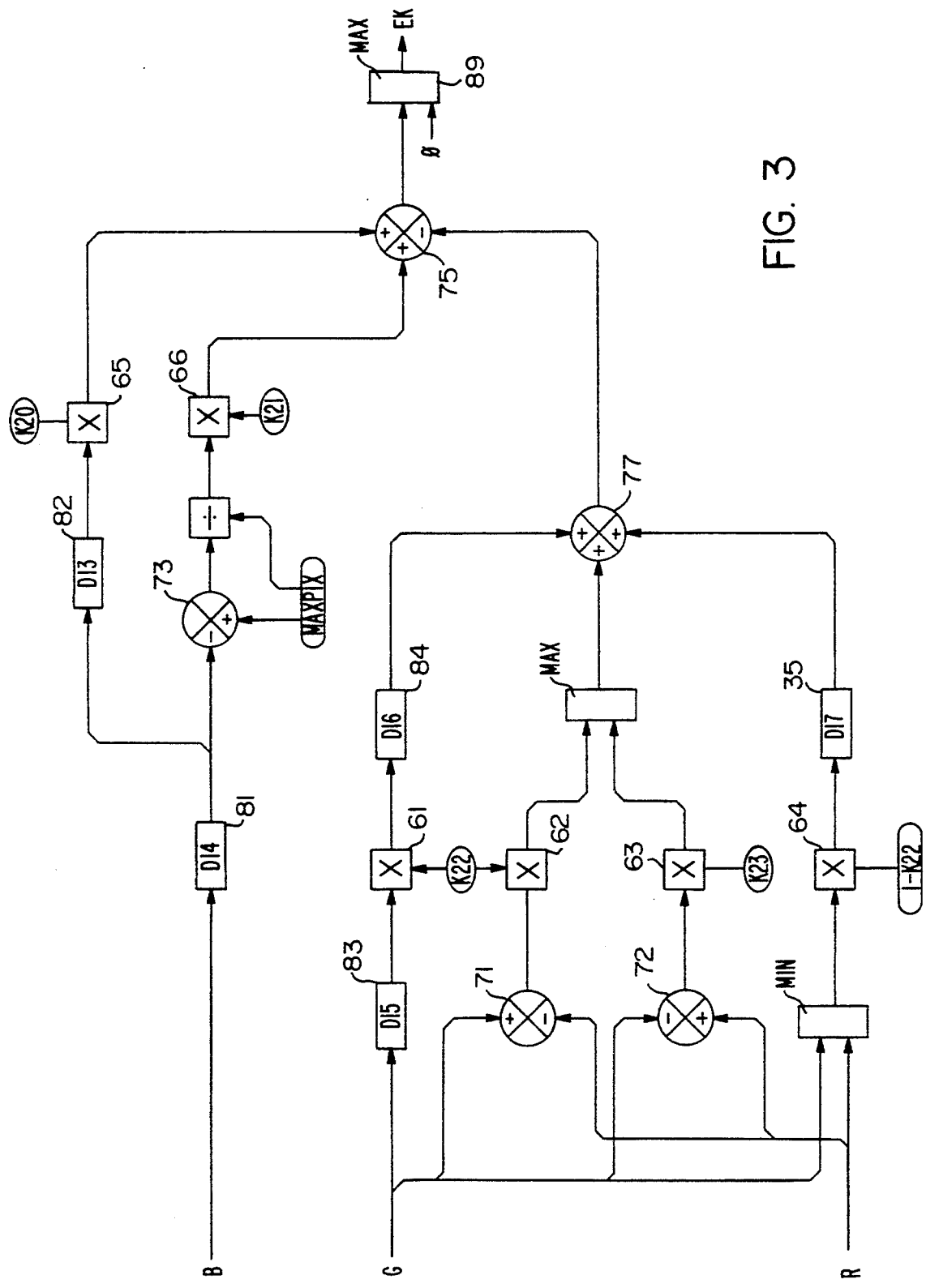
FIG. 3 is a block diagram of the $E_k$ generator block 4 of FIG. 1.
Figure 4:
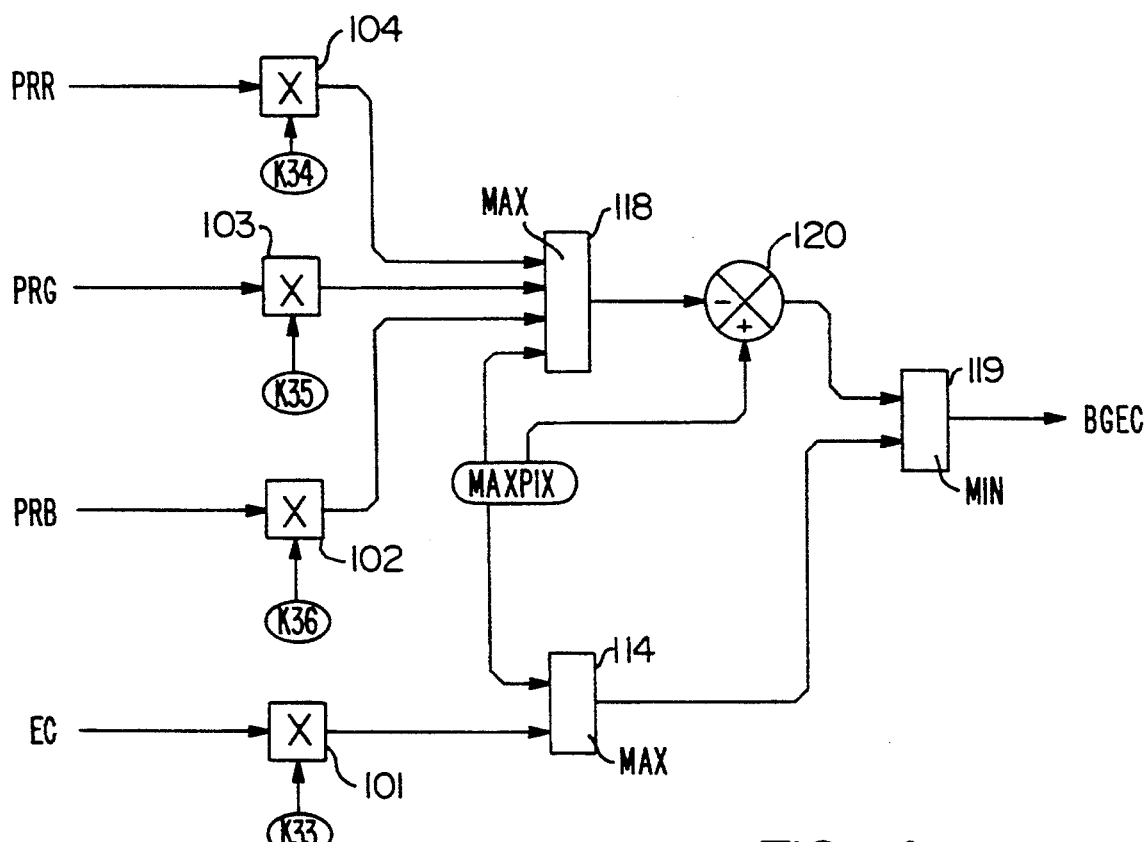
FIG. 4 is a block diagram of the $BGE_c$ generator block 5 of FIG. 1.

An example of how to implement the improved image compositing equations in hardware is shown in FIGS. 1-4. FIG. 1 is a block diagram of a basic image compositing system. FIGS. 2, 3 and 4 are expanded block diagrams of sections of FIG. 1 where the new improved equations have been utilized.

$E_c$GEN 1 generates the $E_c$ control signal according to the techniques described above. A specific circuit for generating the $E_c$ control signal according to Eq.-10, Eq.-11, Eq.-11a or Eq.-12-14a should be apparent to persons skilled in the art. An example of a suitable circuit is shown in FIG. 2 which illustrates an implementation of Eq.-14a. The matte controls 11, specified as K numbers, are defined as follows:
K1 = BLACK GLOSS
K2 = MATTE DENSITY
K3 = DENSITY BALANCE 1
K4 = DENSITY BALANCE 2
K5 = DENSITY 1
K6 = DENSITY 2

These controls are set by the system operator or under computer control. Elements 21, 23, 25, 27 and 29 are multipliers. Elements 31, 33, 35 and 37 are difference circuits. Elements 39, 41 and 43 are delay circuits. Element 45 passes the minimum of its inputs. Elements 47, 49 and 51 pass the maximum of their inputs. In this connection, since one of the inputs to element 49 is 0, element 49 functions as a zero clip.

$E_c$ Max detector 2 detects the maximum $E_c$ value and position generated by the circuit of FIG. 2 for the current image being processed. The specifics of a suitable circuit to perform this function should be readily apparent to persons skilled in the art.

This value and position information is passed to RGB bias circuit 3 which generates proper bias values needed to process the foreground image so that the screen area of the image is correctly suppressed to black. Veil controls 61 are operator adjusted overrides for these bias values. A suitable RGB bias circuit 3 is described in U.S. Pat. No. 4,625,231 which issued Nov. 25, 1986 and is assigned to Ultimatte Corporation.

$E_k$ generation circuit 4 represents the improved flare suppression or $E_k$ generation of the present invention. FIG. 3 is a detailed block diagram of $E_k$ generation circuit 4, for a circuit equivalent to Eq.-17. The flare controls, specified as K numbers, are defined as follows:

K20 = White Balance
K21 = Black Balance
K22 = Gate 1
1-K22 = Gate 3
K23 = Gate 2

As this example is for set blue screen, $E_k$ suppresses flare from the foreground blue channel. In FIG. 3, elements 61-66 are multipliers, elements 71-73 are difference circuits, element 75 is an adder/difference circuit, element 77 is an adder. Also shown in FIG. 3 are delay elements 81-85, minimum select circuit 91, maximum select circuits 87 and 89 and divide circuit. MAXPIX is input to difference circuit 73 and divide circuit. K21 described above is input to multiplier 66. K20 described above is input to multiplier 65. The constant 1-K22 described above is input to multiplier 64. RGB input to the circuit when processed by the above described circuit elements and constant inputs produces the control signal $E_k$.

$BGE_c$ generation circuit 5 incorporates the invented shadow clean-up equation. FIG. 4 shows a detailed block diagram of $BGE_c$ generation circuit 5 showing an implementation of Eq.-18. The clean-up controls, specified as K numbers, are defined as follows:

K33 = Shadow Clean-up/BG Level Balance
K34 = R Clean-Up
K35 = G Clean-Up
K36 = B Clean-Up When no clean-up is needed, K33 = 1, K34 = K35 = K36 = 0, and K33 acts as the background level balance control, transferring to the background all shadow information that existed in the foreground screen area. When shadows are not required, K33 is set for a value larger than 1, and K34, K35, K36 are set for values larger than 0. These adjustments are set by the operator and are input to multipliers 101-104 respectively having as their other inputs $E_c$, PRB, PRG and PRR respectively. $E_c$ is generated by the circuit of FIG. 2 as described above. PRB, PRG and PRR are processed blue, green and red generated by the operation of difference circuits 111-113 and maximum comparator circuits 115-117 respectively. The results are input to $BGE_c$ generation circuit 5. In FIG. 4, elements 114 and 118 are maximum comparators, element 119 is a minimum comparator and element 120 is a difference circuit.

As shown in the Figure the $BGE_c$ is a signal output by minimum comparator 119.

Referring back to FIG. 1, the background image is multiplied by $BGE_c$ generation circuit 5 by multipliers 121-123, then is summed with processed foreground RGB by adders 131-133 to become a composite image.

The term MAXPIX, shown in FIG. 3 and FIG. 4, is the maximum allowed foreground image value [e.g., 255 for an 8 bits per pixel color system]. This value is system dependent.

D1 to D17 are delay devices that are used to time different paths in the system. The specific delay amounts to use are system dependent. The various difference circuits, adders and comparators may be constructed according to well known techniques.

Although the improvements herein are described for a blue backing, they are also valid for a green backing and red backing. In the case of a green backing, the terms B and G are interchanged. In the case of a red backing, the terms R and B are interchanged.

I claim:

1. A system for compositing video signals having red, blue and green components for a foreground scene and a background scene wherein the foreground scene includes a foreground subject disposed between a colored backing and a video camera, said system comprising:
    a) means (1, 11) for generating a control signal having a level proportional to the brightness and visibility of the colored backing, said control signal being generated such that when equal to zero for portions of foreground subjects which are green or flesh tone, said control signal is not simultaneously reduced for grey scale subjects, whereby print-through is eliminated;
    b) means (3) for adjusting the level of the control signal to match the video signal level of the red, blue and green color components of the video signal for the backing for each line of video;
    c) means (111, 112, 113) for subtracting the level matched control signal from the foreground video color signals;
    d) means (121, 122, 123) for controlling the level of the background scene video signal as a linear function of the control signal;
    e) means (131, 132, 133) for combining the foreground scene video signal, the color components of the backing thereof having been removed independently on each line of video, with the background scene video signal, the level of which has been controlled by the control signal.

2. The system defined by claim 1 further comprising:
    a) means (115, 116, 117) for producing a clean-up signal for each of the red, blue and green components of the foreground scene video signal;
    b) means (5) coupled to said clean-up signal producing means and said control signal generating means for eliminating shadows in said foreground scene video signal while substantially eliminating degradation to fine detail edges.

3. The system defined by claim 1 further comprising:
    a) means (4) for providing flare suppression for blond or brown foreground objects in front of a blue colored backing while substantially eliminating white foreground objects from taking on a warmer hue.

4. The system defined by claim 1 wherein said control signal, Ec, takes on the form:

$$E_c=\{(B-K_1)-K_2 max(G,R)+[max(K_3G,K_4R)-min(G,R)]\}^+.$$

5. The system defined by claim 1 wherein said control signal, Ec, takes on the form:

$$E_c=\{(B-K_1)-K_2 max(K_3G,K_4R)-max[K_5(G-R),K_6(R-G)]\}^+.$$

6. The system defined by claim 1 wherein said control signal, Ec, takes on the form:

$$E_c=\{(B-K_1)-K_2 max(G,R)+[max(K_3G,K_4R)-min(G,R)-max\ [K_5(G-R),K_6(R-G)]\}^+.$$

7. The system defined by claim 1 wherein said control signal, Ec, takes on the form:

$$E_c=\{(B-K_1)-K_2 max[min(G,R),K_3G,K_4R[-max[K_5(G-R),K_6(R-G)]\}^+.$$

8. The system defined by claim 1 wherein said control signal, Ec, takes on the form:

$$E_c=\{(B-K_1)-max[K_2 min(G,R),K_3G,K_4R]-max\ [K_5(G-R),K_6(R-G)]\}^+.$$

9. The system defined by claim 1 wherein said control signal, Ec, takes on the form:

$$E_c=\{[B-K_1]-K_2 MAX[G,R]+MAX[E_cT-2-E_cT3]\}^+.$$

10. The system defined by claim 1 wherein said control signal, Ec, takes on the form:

$$E_c=\{[B-K_1]-K_2 MAX[G,R]+MAX[E_cT-2-E_cT3]-[max\ K_5(G-R),K_6(R-G)]\}^+.$$

11. A method for compositing video signals having red, blue and green components for a foreground scene and a background scene wherein the foreground scene includes a foreground subject disposed between a colored backing and a video camera, said method comprising the steps of:

a) generating a control signal having a level proportional to the brightness and visibility of the colored backing, said control signal being generated such that when equal to zero for portions of foreground subjects which are green or flesh tone, said control signal is not simultaneously reduced for grey scale subjects, whereby print-through is eliminated;

b) adjusting the level of the control signal to match the video signal level of the red, blue and green color components of the video signal for the backing for each line of video;

c) subtracting the level matched control signal from the foreground video color signals;

d) controlling the level of the background scene video signal as a linear function of the control signal;

e) combining the foreground scene video signal, the color components of the backing thereof having been removed independently on each line of video, with the background scene video signal, the level of which has been controlled by the control signal.

* * * * *

UNITED STATES PATENT AND TRADEMARK OFFICE
CERTIFICATE OF CORRECTION

PATENT NO. : 5,343,252
DATED : August 30, 1994
INVENTOR(S) : Arpag Dadourian

It is certified that error appears in the above-indentified patent and that said Letters Patent is hereby corrected as shown below:

In column 9, at lines 54-56 change

"$E_k=\{[K_{20}B+[K_{21}((MAXPIX-B)/MAXPIX)]]-[K_{-22}G+ max[K_{22}(G-R),K_{23}(R-G)]+(1-K_{22-})min(G,R)]\}+$" to -- $E_k=\{[K_{20}B+[K_{21}((MAXPIX-B)/MAXPIX)]]-[K_{22}G+ max[K_{22}(G-R),K_{23}(R-G)]+(1-K_{22})min(G,R)]\}+$ --

In column 11, at lines 13 and 14 change

"$BGE_c=\{min\{K_{33}E_c,[MAXPIX-max(K_{34}PR\ R, K_{35}PR\ G, K_{36}PR\ B)]\}\}+$" to -- $BGE_c=\{min\{K_{33}E_c,[MAXPIX-max(K_{34}PR\ R, K_{35}PR\ G, K_{36}PR\ B)]\}\}+$ --

UNITED STATES PATENT AND TRADEMARK OFFICE
CERTIFICATE OF CORRECTION

PATENT NO. : 5,343,252
DATED : August 30, 1994
INVENTOR(S) : Arpag Dadourian

It is certified that error appears in the above-indentified patent and that said Letters Patent is hereby corrected as shown below:

In column 11, at line 20 change "$K_{36}32$ B CLEAN-UP" to -- $K_{36}$ = B CLEAN-UP --

In column 16, at lines 4 and 5 change

"$E_c = \{[B-K_1]-K2 MAX[G,R]+MAX\{E_c T-2-EcT3\}-[max\ K5(G-R), K_6(R-G)]\}+$"   to -- $E_c = \{[B-K_1]-K2 MAX[G,R]+MAX\{E_c T2-EcT3\}-[max\ K5(G-R), K_6(R-G)]\}+$ --

Signed and Sealed this

Twenty-fifth Day of April, 1995

Attest:

BRUCE LEHMAN

*Attesting Officer*          *Commissioner of Patents and Trademarks*